United States Patent [19]

Kimmel et al.

[11] 4,018,637

[45] Apr. 19, 1977

[54] NITROCELLULOSE LACQUER WITH SURFACTANT

[75] Inventors: Earl J. Kimmel, Tallahassee, Fla.; Charles Earnest Silk, deceased, late of Alton, Ill., by Wilma F. Silk, sole heir

[73] Assignee: Olin Corporation, New Haven, Conn.

[22] Filed: Feb. 20, 1975

[21] Appl. No.: 551,441

[52] U.S. Cl. ............................... 149/96; 149/100; 252/358; 536/38

[51] Int. Cl.$^2$ ................. C06B 25/18; C06B 25/20; C09K 3/00; C08B 5/04

[58] Field of Search ................ 149/96, 100, 108.8; 260/222, 223; 252/358

[56] References Cited

UNITED STATES PATENTS

| | | | |
|---|---|---|---|
| 3,163,567 | 12/1964 | Silk | 149/2 |
| 3,200,092 | 8/1965 | Bergman | 260/17 |
| 3,235,420 | 2/1966 | Murphy | 149/100 |
| 3,251,823 | 5/1966 | Murphy | 260/223 |
| 3,535,174 | 10/1970 | Bornstein | 149/100 |
| 3,671,515 | 6/1972 | Cox | 149/96 |
| 3,702,353 | 11/1972 | Henderson | 149/100 |

*Primary Examiner*—Stephen C. Bentley
*Assistant Examiner*—Donald P. Walsh
*Attorney, Agent, or Firm*—Donald R. Motsko; William W. Jones

[57] ABSTRACT

A nitrocellulose-containing lacquer for producing a smokeless powder propellant, which lacquer includes nitrocellulose, a solvent for the nitrocellulose, water, and a surfactant for preventing the water from forming discrete globules in the lacquer.

9 Claims, No Drawings

NITROCELLULOSE LACQUER WITH SURFACTANT

This invention relates to a lacquer from which propellant powder is formed, and more particularly to a lacquer containing nitrocellulose, water, a solvent for the nitrocellulose, and a surfactant for preventing the formation of discrete water globules in the lacquer.

Government regulations require that fibrous nitrocellulose contain a minimum of 20% water for interstate shipment, and usually shipments will contain from 28% to 35% water as received from the manufacturer. The entrained water is both difficult and hazardous to remove and thus it is desirable to use the nitrocellulose as received, nitrocellulose forming the basic raw material from which modern smokeless powder propellants are produced.

One process for forming smokeless powder propellants from nitrocellulose is described in U.S. Pat. No. 3,163,567, issued Dec. 29, 1964 to C. E. Silk. This process involves the extrusion of a nitrocellulose-containing lacquer through an orifice and the subsequent cutting of the extrudate into discrete discs of material which are then hardened to form propellant grains.

The lacquer used in this graining process is formed by adding a solvent for nitrocellulose to the water-nitrocellulose mixture, the solvent being immiscible with the water. The resulting lacquer is in the form of an emulsion consisting of the solvent and dissolved nitrocellulose with suspended globules of water distributed throughout the solvate. It has been noted that this unincorporated water creates problems in pumping, flow properties, and extrusion characteristics of the lacquer. The dispersed water globules break down under shear stress at pipeline walls and moving parts of the pump to produce very erratic flow characteristics. When the lacquer is to be extruded through an orifice, the dispersed globules of water produce erratic flow through the orifice due to the high shear and compressive forces generated as the lacquer flows through the orifice constriction.

This invention solves the problems described above by encorporating into the lacquer a surfactant which acts as an emulsion inhibitor and prevents the formation of free water globules in the lacquer. The water thus no longer exists as a separate phase and does not interfere with the flow and extrusion properties of the lacquer.

Examples of suitable surfactants which may be used as emulsion inhibitors are: polyoxyethylene (20) sorbitan monooleate; polyoxyethylene (20) sorbitan monostearate; sorbitan monooleate; and sorbitan monostearate or mixtures thereof. The listed surfactants are nonionic, however, it will be readily appreciated that cationic and/or anionic surfactants or mixtures thereof could be used in accomplishing the objectives of this invention. Furthermore, the specific amount of surfactant used is not deemed critical so long as the amount used is sufficient to prevent the formation of water globules in the lacquer.

It is, therefore, an object of this invention to provide a lacquer of nitrocellulose, water, a solvent for the nitrocellulose, and an emulsion inhibitor all in a homogeneous mixture.

It is a further object of this invention to provide a lacquer of the character described which is substantially devoid of suspended globules of free water.

It is yet another object of this invention to provide a lacquer of the character described wherein the emulsion inhibitor is a surfactant.

These and other objects of the invention will become more readily apparent from the following.

An amount of solvent, preferably ethyl acetate, is added to a mixture of nitrocellulose and water, the ratio of solvent to nitrocellulose being relatively low, in the range of about 2:1 to 3:1 to form a lacquer. At the same time the solvent is added, there is also added a surfactant in the range of 0.01 to 2.0% of the total lacquer weight. The mixture is agitated until a homogeneous lacquer is formed. The lacquer is substantially free from dispersed water globules and can be readily pumped through a transfer system and extruded through an orifice to form discrete homogeneous grains. The major portion of the surfactant is leached from the resultant lacquer grains during the shaping and solvent removal phase of the propellant-forming process, which phases are conventional steps in the formation of propellant grains after extrusion of a lacquer as disclosed in U.S. Pat. No. 3,163,567. The ballistic properties of the resultant propellant grains are unaffected by the use of the surfactant in the original lacquer.

It will be readily appreciated that the specific solvent for nitrocellulose can be selected from any number of known solvents, for example, ethyl acetate, methyl ethyl ketone, ethyl formate, isopropyl acetate, diethyl ketone, and mixtures thereof. The emulsion inhibitor can be selected from any number of surfactants which will prevent the formation of water globules in the lacquer, and the amount of surfactants added to the lacquer need only be sufficient to prevent the formation of the emulsion. The resultant non-emulsified lacquer displays consistant flow characteristics and is readily pumpable and extrudable in homogeneous fashion.

Since many changes and variations of the disclosed embodiment of the invention may be made without departing from the inventive concept, it is not intended to limit the invention otherwise than as required by the appended claims.

What is claimed is:

1. A process for forming a flowable lacquer comprising the steps of:
   a. providing a supply of a major amount of nitrocellulose and a minor amount of water;
   b. adding to said supply an amount of solvent sufficient to dissolve said nitrocellulose, said solvent being immiscible with said water; and
   c. adding to said supply an amount of an emulsion inhibitor sufficient to prevent said water from forming discrete globules in the mixture of solvent and dissolved nitrocellulose.

2. The process of claim 1 including the step of agitating said lacquer after said solvent and emulsion inhibitor are added.

3. The process of claim 1 wherein said emulsion inhibitor is a surfactant.

4. The process of claim 3 wherein said surfactant is present in the range of about 0.01 to 2.0% by weight of said lacquer.

5. The process of claim 3, wherein said surfactant is selected from the group consisting of polyoxyethylene (20) sorbitan monooleate, polyoxyethylene (20) sorbitan monostearate, sorbitan monooleate, sorbitan monostearate, and mixtures thereof.

6. A flowable lacquer for the manufacture of propellant grains, said lacquer comprising a mixture of a major amount of nitrocellulose and a minor amount of water, a solvent in sufficient quantity to dissolve said nitrocellulose, and an emulsion inhibitor in sufficient quantity to prevent formation of discrete water globules in said lacquer.

7. The lacquer of claim 6 wherein said emulsion inhibitor is a surfactant.

8. The lacquer of claim 7 wherein said surfactant is present in the range of about 0.01 to 2.0% by weight of said lacquer.

9. The lacquer of claim 7 wherein said surfactant is selected from the group consisting of polyoxyethylene (20) sorbitan monooleate, polyoxyethylene (20) sorbitan monostearate, sorbitan monooleate, sorbitan monostearate, and mixtures thereof.

* * * * *